UNITED STATES PATENT OFFICE.

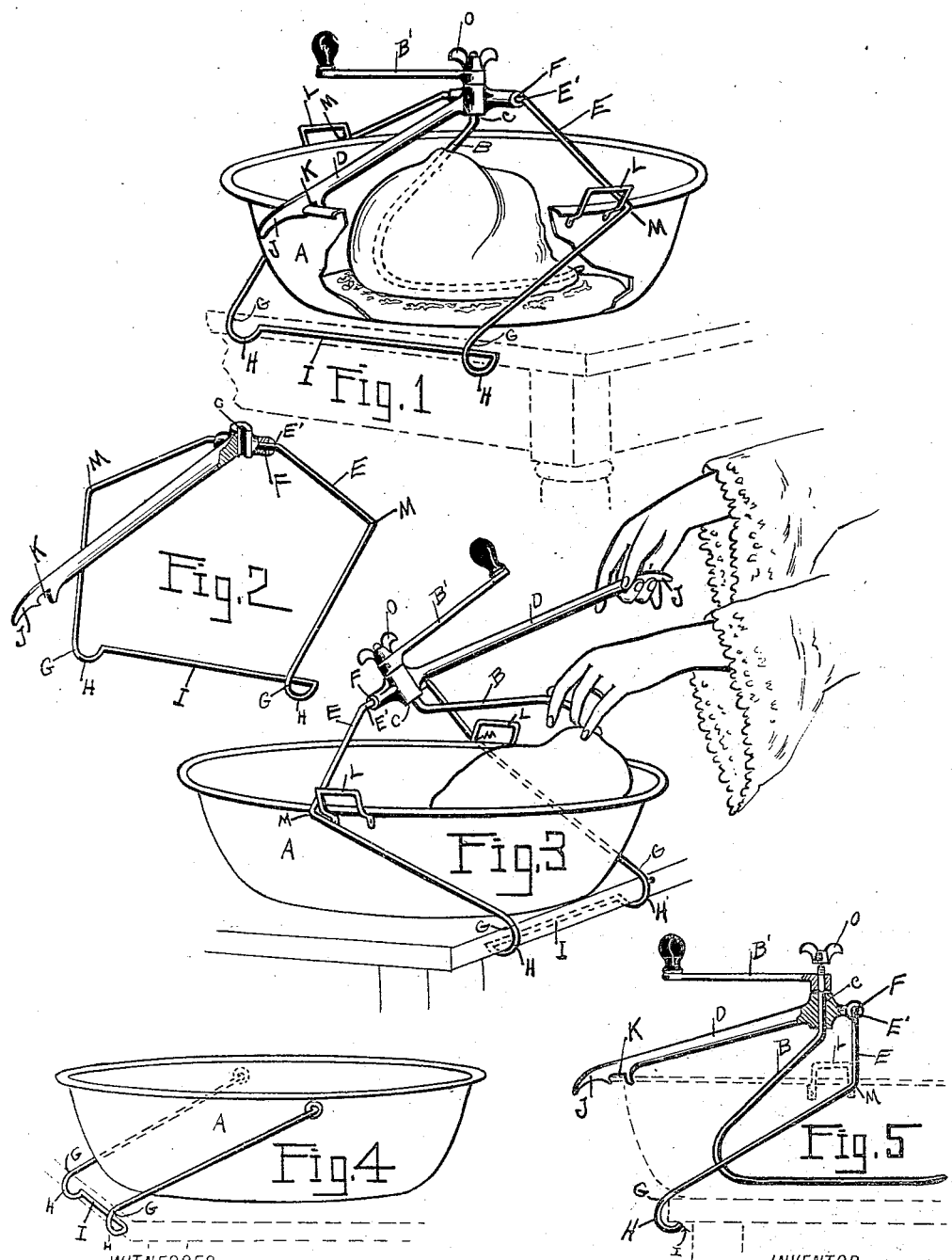

ROBERT WATSON JAMIESON, OF NEW YORK, N. Y., ASSIGNOR TO R. W. JAMIESON COMPANY, OF NEW YORK, N. Y.

DOUGH-MIXER.

No. 817,644.        Specification of Letters Patent.        Patented April 10, 1906.

Application filed January 19, 1905. Serial No. 241,733.

*To all whom it may concern:*

Be it known that I, ROBERT WATSON JAMIESON, a citizen of the United States, and a resident of New York, in the county of New York and State of New York, have invented certain new and useful Improvements in Dough-Mixers, of which the following is a specification, reference being had to the accompanying drawings.

My invention relates to an improved apparatus for mixing dough; and the object of my invention is to provide a simple, practical, and inexpensive dough-mixing device, one that can be quickly attached to any table or ledge, and one that can be sold at a low price.

In the accompanying drawings, Figure 1 is a perspective view of the device, showing the pan in section. Fig. 2 shows the arm and bearings in section. Fig. 3 is a view of the machine, showing the hingeably-mounted lever and the way to strip the dough from the mixing member. Fig. 4 is a view of the pan, showing another form of the means for steadying the pan. Fig. 5 is a side elevation of the device.

A represents a mixing-receptacle.

B represents the mixing member. B' represents a crank mounted on said mixing member and held fixed by a thumb-screw O, so that said mixing member can be rotated in the vertical bearing C, said bearing being part of the arm D, which is hingeably supported in the bearing F, and being mounted on the horizontal portion E' of frame E, permitting the arm D to be raised, as shown in Fig. 3, so that the dough can be conveniently pushed from the mixing member after it has been kneaded, and at the same time the pan can be readily removed from the frame while the mixing member is tilted out of the pan without detaching the mixing member.

In the kneading operation the dough tends to rise upon the mixing member, and where the pan is shallow I find it necessary to raise the bearings C and F above the rim of the pan. Therefore I incline the frame upward from its junctions M M to its horizontal portion E'.

In the operation of my device it is essential that the pan be held rigidly from turning during the kneading operation, and to this end I provide a frame having bent portions being rigidly connected by a connecting member I and inclining downward from its junctions M M to its clamping members G.

The frame is preferably made from tinned wire, and the lower portion of said frame terminates in the clamping members G, the said members being formed in such a manner that its two bent portions H H are held fixed by a connecting portion I, forming a clamping member for the purpose of steadying the pan and holding it rigidly during the kneading operation by pressing downward and forward on the end of the arm D, which terminates into the handle J, while the pan is gripped by the groove K, the frame E being bent in such a manner that the bales or projections L on the mixing-receptacle A engage the frame at its bent junctions M M, which serves to prevent the pan from turning and to hold it rigidly. The hooked members H H can be of any convenient bend connected by a member, and I do not limit my claims in this respect.

I claim—

1. In a dough-mixer, a vessel, a supporting-arm comprising a vertical bearing, a horizontal bearing and a handle portion, said arm being hingeably mounted on a frame, said frame comprising a supporting portion over said receptacle, bent hooked clamping portions connected to said supporting portion by bends, said hooked portions joined by a connecting portion, a mixing member mounted to revolve in said vertical bearing and a means for revolving said mixing member, as and for the purpose set forth.

2. In a dough-mixer, a vessel, a supporting-arm comprising a vertical bearing and a horizontal bearing, a handle portion and a recess in said arm, said arm being hingeably mounted on a frame, said frame comprising a supporting portion over said receptacle, bent hooked clamping portions connected with said supporting portion by bends, said hooked clamping portions joined by a connecting portion, a mixing member mounted to revolve in said vertical bearing and a means for revolving said mixing member, as and for the purpose set forth.

3. In a mixer, a vessel, an arm comprising a vertical bearing, and a horizontal bearing, said arm being hingeably mounted on a frame, said frame comprising a supporting portion over said receptacle, two armed portions one at each side of said receptacle connected to the supporting portion by bends, said armed portions terminating in hooked portions, said hooked portions joined by a connecting portion, a mixing member mounted to revolve in said vertical bearing for the purpose set forth.

4. In a dough-mixer the combination with a mixing-receptacle, of a supporting-frame supported on the rim of said receptacle, of a vertical rotatable mixing member, of a tiltable arm on which the said mixing member is mounted said arm being hingeably connected to said frame as specified.

5. In a dough-mixer, the combination with a mixing-receptacle of a vertically-rotatable mixing member tiltably mounted on a frame over said receptacle, said frame comprising a horizontal supporting portion, arm portions, bent hooked clamping portions and a connecting portion for connecting said hooked portions, for the purpose specified.

ROBERT WATSON JAMIESON.

Witnesses:
CHAS. ANGELL,
CHAS. EIGENMADT.